United States Patent
Varnum

(10) Patent No.: US 7,284,327 B1
(45) Date of Patent: Oct. 23, 2007

(54) METHOD OF INSTALLING AN INFLATING TUBE WITHIN A TIRE

(76) Inventor: Mark W. Varnum, 3524 E. Costano Dr., Camarillo, CA (US) 93010

(*) Notice: Subject to any disclaimer, the term of this patent is extended or adjusted under 35 U.S.C. 154(b) by 642 days.

(21) Appl. No.: 10/910,081

(22) Filed: Aug. 2, 2004

Related U.S. Application Data

(63) Continuation-in-part of application No. 10/615,463, filed on Jul. 7, 2003, now abandoned.

(51) Int. Cl.
B21D 53/26 (2006.01)
B23P 19/04 (2006.01)

(52) U.S. Cl. .............. 29/894.37; 29/894.31; 29/894.3; 29/221.5; 81/15.2; 152/431

(58) Field of Classification Search .......... 29/221.5, 29/221.6, 213.1, 894.351, 894.381, 894.3, 29/468; 81/15.2, 15.4; 152/431
See application file for complete search history.

(56) References Cited

U.S. PATENT DOCUMENTS

| | | | | |
|---|---|---|---|---|
| 2,158,576 A * | 5/1939 | Glassley | .......... | 152/415 |
| 2,679,654 A * | 6/1954 | Hosking | .......... | 7/170 |
| 2,709,383 A * | 5/1955 | Davies | .......... | 29/221.5 |
| 3,100,335 A * | 8/1963 | Lea | .......... | 29/221.5 |
| 3,882,920 A * | 5/1975 | Barnes et al. | .......... | 157/1.1 |
| 3,928,902 A * | 12/1975 | Seims et al. | .......... | 29/221.5 |
| 4,048,614 A * | 9/1977 | Shumway | .......... | 340/447 |
| 5,203,064 A * | 4/1993 | Johnson | .......... | 29/271 |
| 2003/0066176 A1* | 4/2003 | Rivers | .......... | 29/221.5 |
| 2005/0011062 A1* | 1/2005 | Hayes | .......... | 29/221.5 |
| 2005/0242937 A1* | 11/2005 | Yokoi et al. | .......... | 340/447 |

\* cited by examiner

Primary Examiner—David P. Bryant
Assistant Examiner—Alexander Taousakis
(74) Attorney, Agent, or Firm—Jack C. Munro

(57) ABSTRACT

A valve stem puller which comprises a length of flexible elongated member which is connected at one end to a ring and at an opposite end to an externally threaded plug. The valve stem puller is to be utilized by inserting such through a fastener nut and then through a valve stem mounting hole in a tire rim and then threadably connecting the externally threaded plug onto a valve stem of an inflating tube and then inserting the inflating tube about the tire rim and within the confines of the tire, pulling on the flexible elongated member to cause the valve stem to connect with the valve stem mounting hole in a close conforming manner. A fastening nut is then threadably mounted about the valve stem to secure such in position. The tire is then completely installed on the tire rim and the externally threaded plug is then removed from the valve stem.

2 Claims, 2 Drawing Sheets

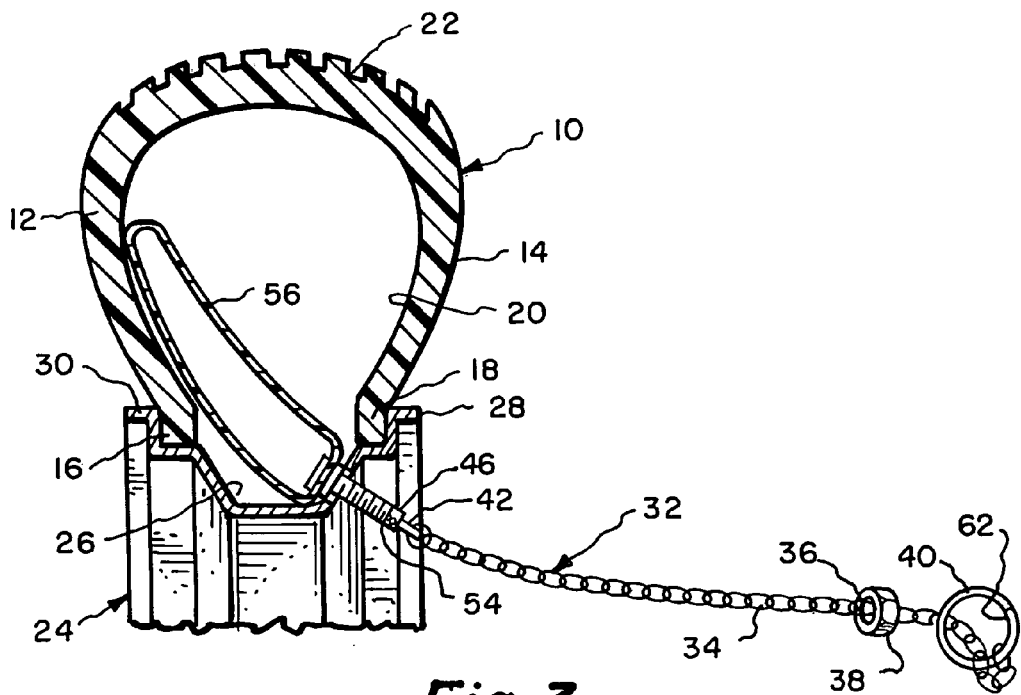
Fig. 3.
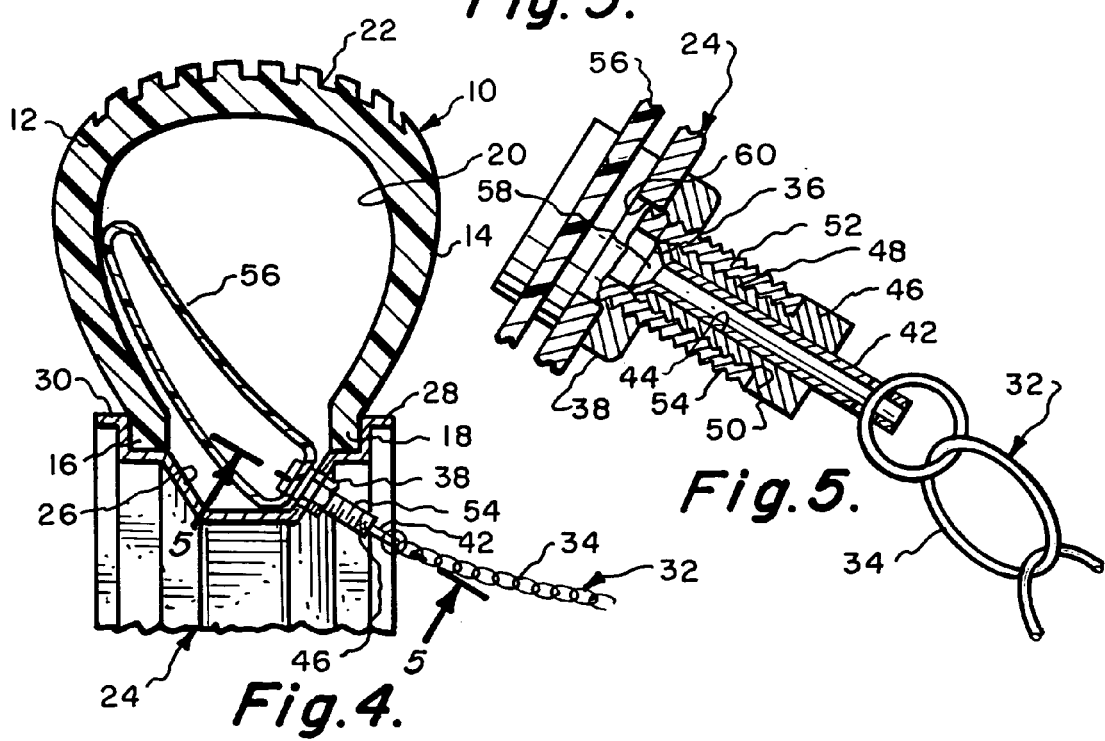
Fig. 4.
Fig. 5.

METHOD OF INSTALLING AN INFLATING TUBE WITHIN A TIRE

REFERENCE TO PRIOR APPLICATION

This application is a continuation-in-part of U.S. patent application Ser. No. 10/615,463, filed Jul. 7, 2003 now abandoned, entitled, VALVE STEM PULLER AND METHOD OF INSTALLING AN INFLATING TUBE WITHIN A TIRE, by the present inventor.

BACKGROUND OF THE INVENTION

1. Field of the Invention

This invention relates to a tool which facilitates the repair and reassembly of a vehicle tire and its inflating tube that is mounted therein.

2. Description of the Related Art

The subject matter of this invention is designed particularly to be used in conjunction with bicycle tires and motorcycle tires although this invention could be used with any tire of any vehicle.

Tires of motorcycles and bicycles are narrow and are also mounted on a relatively large diameter tire rim. When a tire has become flat or is being initially installed in position on the rim, the typical installing procedure is to force one tire bead of one sidewall of the tire casing over a rim flange of the tire rim thereby locating that tire bead in conjunction with the annular tire mounting cavity of the tire rim. Only a small space is now provided between the tire rim and the other sidewall of the tire casing. The typical procedure is to take an inflating tube and force such bit-by-bit through the small space into the tire mounting cavity until the entire tube is mounted within this cavity. Once the tube is within the cavity, it is necessary to find the valve stem and then manually cause that valve stem to connect with a valve stem mounting hole mounted in the rim and thread such through that hole. This is not an easy installing procedure.

In the past, for automobile tires, it has been known to utilize a tool that is installed in conjunction with the valve stem of the tube prior to the tube being inserted within the tire mounting cavity. This tool is inserted through the valve stem mounting hole prior to connecting with the valve stem. Therefore, when the tube is installed in conjunction with the tire mounting cavity, it is only necessary to pull on the tool which will then drag the valve stem into the valve stem mounting hole. This has eliminated the procedure of trying to put one's hand through the small space that is provided between the partially installed tire and the tire rim and finding the valve stem and then manually direct that valve stem into the valve stem mounting hole.

However, the prior art tool, which was designed to be used on automobile tires, includes a length of chain at one end on which is mounted a cap. This cap is internally threaded and the valve stem is to be threaded to the cap. The problem is the cap is larger than the valve stem. The valve stem mounting holes for automobile tires are made substantially larger in diameter so it is not a problem for this cap to be pulled through the mounting hole. However, valve stem mounting holes for motorcycles are made of a diameter just slightly larger than the valve stem. This means that that prior art device is not usable since the cap is too large of a diameter to be threaded through the valve stem mounting hole.

Also, threadingly attaching of the cap to the valve stem by the prior art device would cause the chain to twist forming knots in the chain. It would be desirable to design a valve stem puller which did not cause twisting of the chain when such is attached to the valve stem.

SUMMARY OF THE INVENTION

A method of installing an inflating tube in a tire comprising the steps of utilizing a tire rim having an annular tire mounting cavity and a valve stem mounting hole, utilizing a valve stem puller which has a length of flexible elongated member which is connected at one end to a ring and at an opposite end to an externally threaded plug, installing a threaded nut on the flexible elongated member, inserting the flexible elongated member through the valve stem mounting hole within the tire rim, inserting a tire bead of a first sidewall of a tire casing in conjunction with the tire mounting cavity of the tire rim, screwing the plug into a valve stem on the tube, installing the tube within the tire connecting with the tire mounting cavity, pulling on the flexible elongated member until the valve stem is mounted on the valve stem mounting hole with the flexible elongated member, plug and ring all now located exteriorly of the tire rim, inserting a second sidewall of a tire casing in conjunction with a tire mounting cavity and then disconnecting the plug from the valve stem.

A method of installing an inflating tube in a tire comprising the steps of utilizing a tire rim which has an annular tire mounting cavity and a valve stem mounting hole utilizing a valve stem puller which has a length of flexible elongated member which is connected at one end to a ring and at an opposite end to an externally threaded plug, installing a threaded nut on the flexible elongated member, inserting the flexible elongated member through the valve stem mounting hole by installing the threaded plug through the ring, inserting a tire bead of a first sidewall of a tire casing in conjunction with the tire mounting cavity, screwing the plug into a valve stem on the tube, installing the tube within the tire connecting with the tire mounting cavity, pulling on the flexible elongated member until the valve stem is mounted in the valve stem mounting hole with the flexible elongated member, plug and ring all located exteriorly of the tire rim, inserting a tire bead of a second sidewall of the tire casing in conjunction with the tire mounting cavity, and disconnecting the plug from the valve stem.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 3 is a view similar to FIG. 2 but where the valve stem puller has been manually pulled causing the valve stem of the tube being snugly mounted within the valve stem mounting hole of the tire rim;

FIG. 4 is a view similar to FIG. 3 but showing a fastening nut that had been installed about the flexible elongated member of the puller now being moved and threadably secured in conjunction with the valve stem; and FIG. 5 is a longitudinal cross-sectional view through the valve stem with the plug of the puller being mounted in conjunction with the valve stem and the nut installed about the valve stem taken along line 5-5 of FIG. 4.

DETAILED DESCRIPTION OF THE INVENTION

Figure 1:
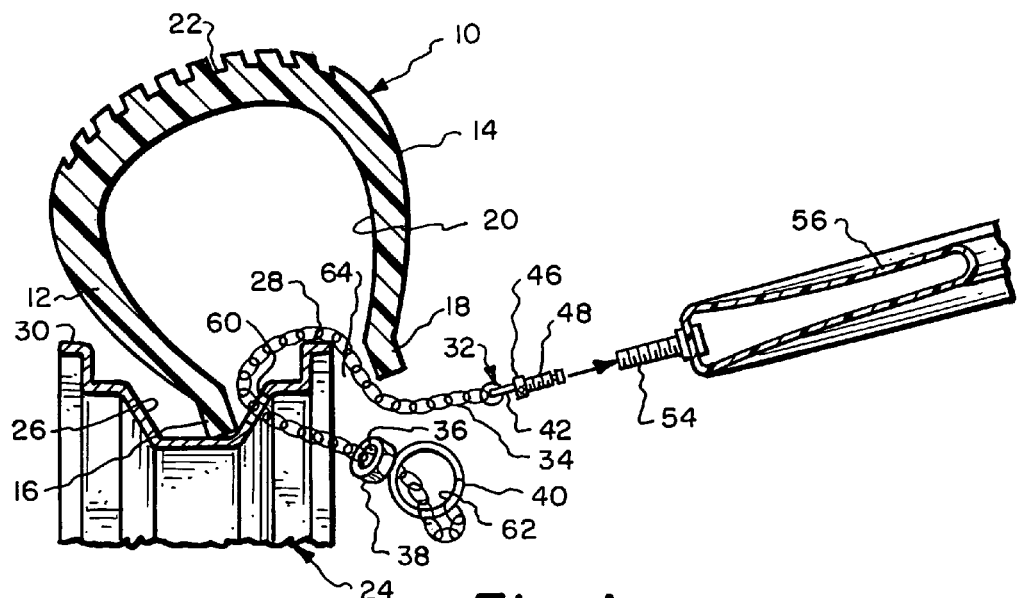
FIG. 1 is a cross-sectional view through a tire rim in a tire showing the initial installation of a tire bead of one sidewall of the tire casing in conjunction with a tire mounting cavity of the tire rim and also showing the valve stem puller of the present invention being mounted through a valve stem mounting hole formed within the tire rim and connecting with an inflating tube which is located exteriorly of the tire rim.

Referring particularly to the drawings, there is shown in FIGS. 1-4 a tire casing 10 that has a pair of sidewalls 12 and 14 each of which terminates at a tire bead 16 and 18 respectively. The sidewalls 12 and 14 enclose an annular internal chamber 20. It is to be understood that the tire casing 10 will normally be constructed of a rubber composition. The exterior surface of the tire casing 10 includes a series of traction treads 22. FIGS. 1-4 also show a tire rim 24 which has as its exterior peripheral surface a tire mounting cavity 26. The forward and aft edges of the tire mounting cavity 26 are formed respectively into a rim flange 28 and a rim flange 30.

The valve stem puller 32 of the present invention comprises a length of flexible elongated member 34 which is selected to be small enough in lateral cross-section to slide through a through hole 36 formed within a fastener nut 38. Although a chain is shown in the drawings as the flexible elongated member 34, it is considered to be within the scope of this invention to use a cable, a plastic rope or even a strip of material. One end of the flexible elongated member 34 is connected to a handle device in the form of a ring 40. Although a ring 40 is preferred, it is considered to be within the scope of this invention that other shapes of handle devices could be utilized. The opposite end of the flexible elongated member 34 is connected to a sleeve 42. The sleeve 42 is mounted within a longitudinal through hole 44 of a plug 46. The exterior surface of the plug 46 includes a series of external threads 48.

The threads 48 are to be threadably securable to the internal threads 50 of a valve stem 52. The valve stem 52 also includes a series of external threads 54. The valve stem 52 is mounted within the sidewall of an inflating tube 56. The inflating tube 56 would normally be constructed of rubber, and its intent and purpose is to hold pressurized air and pressed tightly against the wall surface of the annular internal chamber 20 of the tire casing 10. This will result in inflation of the tire casing 10 so that the tire casing 10 can be operated in a normal manner on the particular vehicle on which it is mounted which will usually be a bicycle or a motorcycle. The inner end of the sleeve 42 is flared outwardly forming a cone shaped extension 58. Cone shaped extension 58 is to rest against annular flared inner end surface of the plug 46 to a result that the sleeve 42 is freely pivotable relative to the plug 46. It is to be understood that within the valve stem 52 there is located an air inflating valve, which is not shown, that when closed will retain the amount of pressurized air that is contained in conjunction with the tube 56.

The method of installing the tube 56 within the tire casing 10 of this invention is as follows: Referring particularly to FIG. 1, the user inserts the fastener nut 38 on the flexible elongated member 34 with the nut 38 located directly adjacent the ring 40. The user inserts the plug 46 through hole 36 of fastener nut 38 and slips plug 46 through the hole 62 in the ring 40 pulling it tight so, as the user installs the tire casing 10, the plug 46 doesn't get pulled into tire mounting cavity 26. The user then forces the tire bead 16 over the rim flange 28 of the tire rim 24 until the tire bead 16 connects with the tire mounting cavity 26, as shown in FIG. 1. The user then proceeds to take the plug 46 and threadably secure it to the internal threads 50 of the valve stem 52 (FIG. 5), and as the plug 46 is threaded to the valve stem 52, no twisting of the flexible elongated member 34 will occur because the plug 46 readily pivots relative to the flexible elongated member 34 due to the pivot joint provided between sleeve 42 and plug 46. The user then proceeds to manually grab tube 56 and when completely deflated force such bit-by-bit through the space 64 between the tire rim 24 and the annular tire bead 18 of a sidewall 14.

Figure 2:
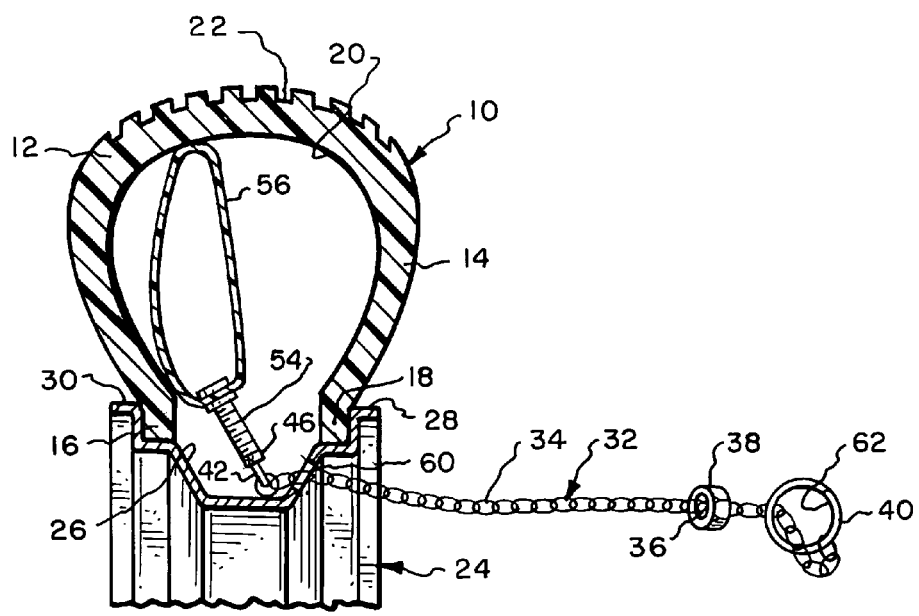
FIG. 2 is a view similar to FIG. 1 but where the inflating tube is now shown being located within the annular internal chamber of the tire.

When the tube 56 is located within the annular internal chamber 20, the next step is to pull on the flexible elongated member 34 until the valve stem 52 is snugly mounted within the valve stem mounting hole 60. The annular tire bead 18 could have been installed prior to this step in conjunction with the tire mounting cavity 26 and abutting against the rim flange 28, as shown in FIG. 2, or could be accomplished after this step. The nut 38 is then slid along the flexible elongated member 34 with the nut 38 then being tightly threadably secured to the external threads 54 abutting against the tire rim 24. This will securely fix in position the valve stem 52 to the tire rim 24. The only thing the installer needs to do at this time is to now unthread the plug 46 relative to the valve stem 52 with the result that the inflating tube 56 is now ready for inflation which will result in the tire casing 10 assuming an expanded usable position.

What is claimed is:

1. A method of installing an inflating tube in a tire comprising the steps of:
    utilizing a tire rim having an annular tire mounting cavity and a valve stem mounting hole;
    utilizing a valve stem puller which has a length of flexible elongated member which is connected at one end to a ring at an opposite end to an externally threaded plug;
    installing a threaded nut on said flexible elongated member;
    inserting said length of flexible elongated member through said valve stem mounting hole;
    inserting a tire bead of a first sidewall of a tire casing in conjunction with said tire mounting cavity;
    screwing said plug into a valve stem on said tube;
    installing said tube within said tire connecting with said tire mounting cavity;
    pulling on said flexible elongated member until said valve stem is mounted in said valve stem mounting hole with said flexible elongated member, plug and ring all located exteriorly of said tire rim;
    threadably attaching said nut onto said valve stem;
    inserting a tire bead of a second sidewall of said tire casing in conjunction with said tire mounting cavity; and
    disconnecting said plug from said valve stem.

2. A method of installing an inflating tube in a tire comprising the steps of:
    utilizing a tire rim having an annular tire mounting cavity and a valve stem mounting hole;
    utilizing a valve stem puller which has a length of flexible elongated member which is connected at one end to a ring and at an opposite end to an externally threaded plug;
    installing a threaded nut on said flexible elongated member;

inserting said length of flexible elongated member through said valve stem mounting hole by installing said threaded plug through said ring;

inserting a tire bead of a first sidewall of a tire casing in conjunction with said tire mounting cavity;

screwing said plug into a valve stem on said tube;

installing said tube within said tire connecting with said tire mounting cavity;

pulling on said flexible elongated member until said valve stem is mounted in said valve stem mounting hole with said flexible elongated member, plug and ring all located exteriorly of said tire rim;

inserting a tire bead of a second sidewall of said tire casing in conjunction with said tire mounting cavity; and disconnecting said plug from said valve stem.

\* \* \* \* \*